United States Patent [19]

Kukes et al.

[11] Patent Number: 4,820,676

[45] Date of Patent: Apr. 11, 1989

[54] TREATED ALUMINA MATERIAL FOR FIXED HYDROFINING BEDS AND PROCESS FOR ITS PREPARATION

[75] Inventors: Simon G. Kukes, Naperville, Ill.; Karlheinz K. Brandes, Bartlesville, Okla.

[73] Assignee: Phillips Petroleum Company, Bartlesville, Okla.

[21] Appl. No.: 199,744

[22] Filed: May 26, 1988

Related U.S. Application Data

[62] Division of Ser. No. 24,756, Mar. 11, 1987, Pat. No. 4,767,523.

[51] Int. Cl.$^4$ .......................... B01J 21/04; B01J 23/74; B01J 23/85; B01J 27/053
[52] U.S. Cl. .................... 502/220; 502/216; 502/217; 502/218; 502/219; 502/221; 502/222; 502/439; 502/208
[58] Field of Search ............... 502/216, 217, 219, 220, 502/221, 222, 208, 218, 439

[56] References Cited

U.S. PATENT DOCUMENTS

| | | | |
|---|---|---|---|
| 2,438,450 | 3/1948 | Nelson | 502/10 |
| 2,666,749 | 1/1954 | Hockstra | 502/8 |
| 2,703,315 | 3/1955 | Murray et al. | 502/8 |
| 2,774,742 | 12/1956 | Stover | 252/448 |
| 2,865,866 | 12/1958 | Hockstra | 502/10 |
| 3,041,271 | 1/1962 | Anderson et al. | 502/8 |
| 3,042,197 | 7/1962 | Binning et al. | 208/143 |
| 3,169,827 | 2/1965 | de Rosset | 208/213 |
| 3,340,180 | 9/1967 | Beuther et al. | 208/251 H |
| 3,530,066 | 9/1970 | Kuwata et al. | 208/213 |
| 3,725,531 | 4/1973 | Pearson et al. | 423/244 |
| 3,867,281 | 2/1975 | Morgan et al. | 208/213 |
| 3,891,541 | 6/1975 | Oleck et al. | 208/251 H |
| 3,898,155 | 8/1975 | Wilson | 208/251 H |
| 3,920,540 | 11/1975 | McCoy et al. | 208/213 |
| 3,992,324 | 11/1976 | Andre et al. | 502/220 X |
| 4,016,067 | 4/1977 | Fischer et al. | 208/251 H |
| 4,019,978 | 4/1977 | Miller et al. | 208/213 |
| 4,039,430 | 8/1977 | Jensen | 208/213 |
| 4,105,587 | 8/1978 | Blakely | 28/251 H |
| 4,188,284 | 2/1980 | Quick et al. | 208/251 H |
| 4,318,801 | 3/1982 | Lese et al. | 502/217 X |
| 4,320,030 | 3/1982 | Happel et al. | 252/432 |
| 4,374,020 | 2/1983 | Trevino et al. | 208/216 R |
| 4,407,735 | 10/1983 | Sawamura | 502/10 |
| 4,411,771 | 10/1983 | Bambrick et al. | 208/112 |
| 4,552,650 | 11/1985 | Toulhoat et al. | 208/251 H |
| 4,568,664 | 2/1986 | Goodboy | 502/330 |
| 4,572,778 | 2/1986 | Ward | 208/251 H |
| 4,584,093 | 4/1986 | Toulhoat et al. | 208/251 H |
| 4,587,012 | 5/1986 | Quann | 208/251 H |
| 4,628,040 | 12/1986 | Green et al. | 502/8 |
| 4,665,048 | 5/1987 | VanLeeuwen et al. | 502/221 |

FOREIGN PATENT DOCUMENTS

| | | | |
|---|---|---|---|
| 38-17955 | 9/1963 | Japan | 502/10 |
| 60-132650 | 7/1985 | Japan | 502/217 |

OTHER PUBLICATIONS

CHE 942, "S-100 Activated Alumina for Claus Catalysis", Alcoa Chemicals Division, 1984.
Technical Bulletins SC:175-80 and SC:462-80, Shell Chemical Company, 1980.
Technical Data, "Actispheres: Protection Upper Layer", Procatalyse, 1985.

*Primary Examiner*—W. J. Shine
*Attorney, Agent, or Firm*—K. K. Brandes

[57] ABSTRACT

A process for preparing impregnated substantially spherical alumina-containing particles comprises the steps of impregnating specific starting material with $(NH_4)_2SO_4$ and then heating the thus impregnated material at about 500°–900° C. for improved crush strength retention. In a preferred embodiment a fixed catalyst bed comprises at least one layer of the alumina-containing particles and at least one layer of catalyst particles comprising a refractory inorganic carrier and at least one hydrogenation promoter.

33 Claims, 4 Drawing Sheets

TREATED ALUMINA MATERIAL FOR FIXED HYDROFINING BEDS AND PROCESS FOR ITS PREPARATION

This application is a division of application Ser. No. 024,756, filed Mar. 11, 1987, now U.S. Pat. No. 4,767,523.

BACKGROUND OF THE INVENTION

This invention relates to the preparation of impregnated, substantially spherical alumina-containing particles having improved crush strength retention. In another aspect, this invention relates to a process for hydrotreating hydrocarbon-containing oils, which also contain sulfur and metal impurities, in the presence of a fixed bed comprising at least one layer of impregnated, substantially spherical aluminacontaining particles. In still another aspect, this invention relates to the use of said at least one layer of impregnated, substantially spherical alumina-containing particles as support layer in a fixed catalyst bed. In a further aspect, this invention relates to a process for catalytically hydrotreating hydrocarbon-containing oils in the presence of water. In still another aspect, this invention relates to a fixed multi-layer hydrotreating catalyst bed system comprising at least one layer of substantially spherical alumina-containing particles.

Fixed beds of hydrotreating catalysts are used in many oil refineries. Examples of processes in which fixed hydrotreating (hydrofining) catalyst beds are used include hydrodenitrogenation, hydrodesulfurization and hydrodemetallization of heavy oils. Generally, a layer of shaped, substantially inert ceramic particles at the bottom of the fixed bed reactor is used to support a column of one or more layers of hydrotreating catalyst. The same shaped, substantially inert material can also be employed as the top layer (i.e., above one or more layers of hydrotreating catalyst) or between layers of hydrotreating catalyst, so as to provide improved flow dispersion of feed oil passing downwardly through the fixed catalyst bed. More recently, promoted alumina spheres, which offer some catalytic activity, have been suggested as replacement for these substantially inert ceramic support particles which generally have little or no catalytic activity for hydrodesulfurization and -demetallization. However, there is an ever present need to develop improved substantially spherical alumina-containing support particles having higher crush strength and higher resistance to specific feed components, such as water, than those presently known, so as to employ these improved alumina-containing support particles under very severe hydrotreating conditions.

SUMMARY OF THE INVENTION

It is an object of this invention to provide impregnated, substantially spherical alumina-containing particles having high crush strength retention. It is another object of this invention to provide a process for making impregnated, substantially spherical alumina-containing particles having high crush strength retention. It is still another object of this invention to provide a process for hydrotreating substantially liquid hydrocarbon-containing feed streams employing a fixed catalyst bed comprising at least one layer of impregnated, substantially spherical alumina-containing particles having high crush strength retention. It is a further object of this invention to provide a process for hydrotreating substantially liquid hydrocarbon-containing feed streams in the presence of water and a fixed catalyst bed comprising at least one layer of impregnated, substantially spherical alumina-containing particles having high crush strength retention. It is still another object of this invention to provide a multi-layer catalyst bed comprising at least one layer of impregnated, substantially spherical alumina-containing particles having high crush strength retention (when exposed to oil and water under hydrotreating conditions). It is a still further embodiment of this invention to employ said multi-layer catalyst bed in said process for hydrotreating substantially liquid hydrocarbon-containing feed streams. Further objects and advantages will be apparent from the detailed description and the appended claims.

In accordance with this invention, a hydrotreating process comprises the step of contacting a substantially liquid (i.e., liquid at the hydrotreating conditions) hydrocarbon-containing feed stream, which also contains compounds of sulfur and metals, with a free hydrogen containing gas in the presence of a fixed catalyst bed comprising (a) at least one layer of impregnated, substantially spherical alumina-containing particles, under such hydrotreating conditions as to obtain at least one liquid hydrocarbon-containing product stream having lower concentrations of sulfur and metals than said hydrocarbon-containing feed stream;

wherein said impregnated, substantially spherical alumina-containing particles in catalyst layer (a) have been prepared by a process comprising the steps of (A) impregnating (i) a starting material of substantially spherical alumina-containing particles which has an initial average particle diameter of at least about 0.05 inch, an initial surface area (determined by the BET/$N_2$ method; ASTM D3037) of at least about 20 $m^2/g$, an initial pore volume (determined by mercury intrusion porosimetry at a pressure ranging from 0 to 50,000 psig) of at least about 1.0 cc/g, and an initial content of $Al_2O_3$ of at least about 80 weight-%, with (ii) a solution (preferably aqueous) comprising dissolved ammonium sulfate; and (B) heating the material obtained in step (A) at a temperature in the range of from about 500° to about 900° C. for a period of time of at least 10 minutes, preferably for a period of time in the range of about 10 minutes to about 20 hours, under such heating conditions as to obtain a material having a higher retention of crush strength (measured after exposure for about 100 hours at a liquid hydrocarbon-containing stream which contains at least about 0.5 weight-% sulfur, under hydrotreating conditions at about 2250 psig total pressure, about 400 psig partial pressure of steam and about 700° F.) than said starting material.

Preferably a drying step (A1) after step (A) is carried out, so as to remove at least a portion of water from the material obtained in step (A). In this preferred embodiment, step (b) is carried out with the product obtained in step (A1).

In one preferred embodiment, said metals in said liquid hydrocarbon-containing feed steam comprise at least one of nickel and vanadium, preferably about 3-500 ppmw Ni and about 5-1,000 ppmw V (ppmw=parts per million parts of feed stream). In another preferred embodiment, said substantially liquid hydrocarbon-containing feed stream also contains water (preferably about 0.5-10 volume-%). In a further preferred embodiment, steam is injected into the fixed catalyst bed during said contacting under hydrotreating conditions.

In a particularly preferred embodiment, said catalyst bed additionally comprises (b) at least one layer of catalyst particles [i.e., hydrotreating catalyst particles; different from the particles in layer (a)] comprising a refractory inorganic carrier (preferably alumina) and at least one (i.e., one or a mixture of two or more) hydrogenation promoter selected from the group consisting of transition metals of Groups IIIB, IVB, VB, VIB, VIIB, VIIIB, IB and IIB of the Periodic Table (as defined in Webster's New Collegiate Dictionary, 1977) and compounds of these metals (preferably Y, La, Ce, Ti, Zr, Cr, Mo, W, Mn, Re, Ni, Co and Cu). The most preferred hydrogenation promoters include oxides and/or sulfides of Mo, Co, Ni and mixtures of two or more of these compounds. In addition to or in lieu of these hydrogenation promoters, one or more compounds of phosphorus can also be present in these catalyst particles.

Also in accordance with this invention, there is provided a composition of matter (suitable as a hydrotreating catalyst composition) comprising (preferably consisting essentially of) impregnated substantially spherical alumina-containing particles, having been prepared by the process comprising steps (A) and (B), and optionally also step (A1), as described above. Further in accordance with this invention, there is provided a process for preparing said composition of matter comprising steps and (A) and (B), and optionally also step (A1), as described above.

Further in accordance with this invention, a fixed catalyst bed (preferably a hydrotreating catalyst bed) is provided comprising (a) at least one catalyst bed layer of impregnated, substantially spherical alumina-containing particles of this invention, having been prepared by the process composing steps (A) and (B), and optionally also step (A1), as described above; and (b) at least one catalyst bed layer of catalyst particles [preferably hydrotreating catalyst particles; different from the particles in layer (a)] comprising a refractory inorganic carrier material and a hydrogenation promoter, as defined above in the description of the hydrotreating process of this invention.

In one preferred embodiment of this invention, said impregnated, substantially spherical alumina-containing particles, which can be used in catalyst bed layer (a), also contain at least one compound of at least one element selected from the group consisting of Y, La, Ce, Ti, Zr, Cr, Mo, W, Mn, Re, Ni, Co, Cu, Zn and P, preferably oxide and/or sulfide of Mo and/or Co and/or Ni (more preferably containing about 0.1-2.0 weight-% Mo) as hydrotreating promoters. In a more preferred embodiment, the impregnating solution used in step (A) (described above in the description of the hydrotreating process) comprises at least one compound of at least one of the elements listed immediately above.

In a further preferred embodiment, said at least one catalyst bed layer (a) is located as support layer below said at least one catalyst bed layer (b). In a still further preferred embodiment, said at least one layer (a) is located on top of said at least one catalyst layer (b). In still another embodiment, one catalyst bed layer (a) is located below said catalyst bed layer (b) and another catalyst bed layer (a) is located above said catalyst bed layer (b). In a further embodiment, layer (a) is located between two layers (b). These configurations of catalyst bed layers described immediately above are preferably employed in the hydrotreating process of this invention.

Figure 1:
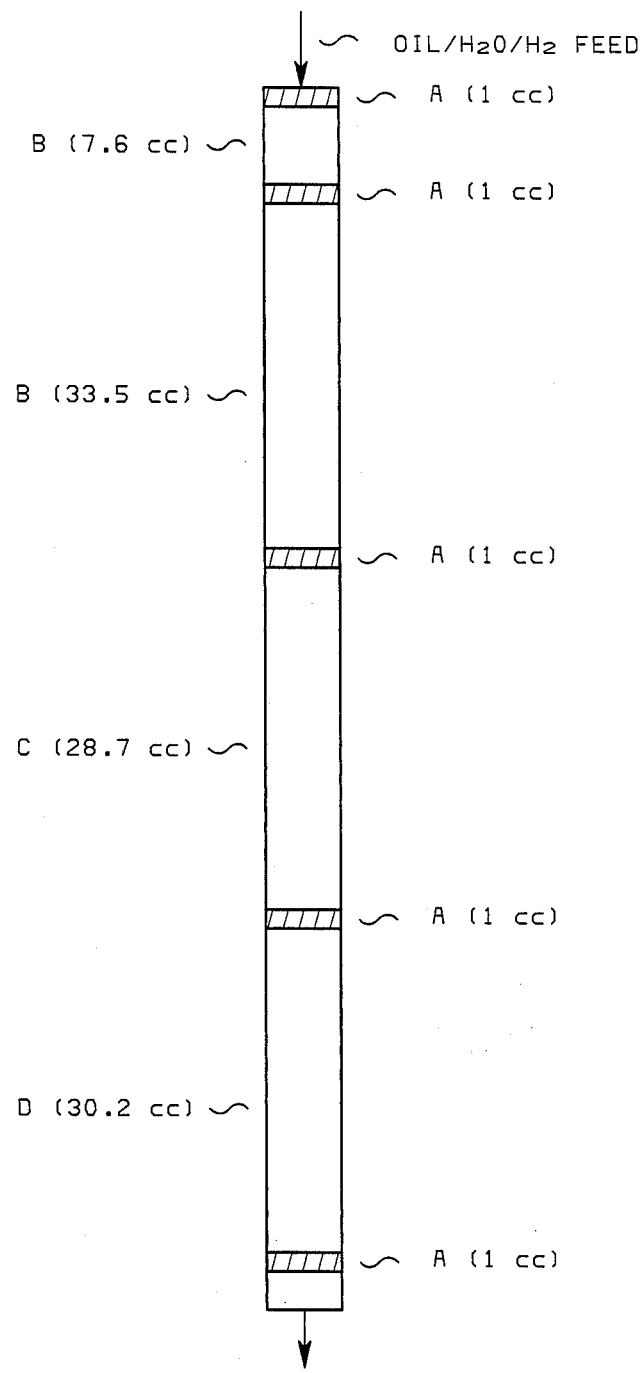
FIG. 1 shows the arrangement of a fixed multi-layer catalyst bed used for testing catalyst in hdyrotreating processes.

DETAILED DESCRIPTION OF THE INVENTION (A) Hydrotreating Process

Any suitable hydrocarbon containing feed stream, which is substantially liquid at the hydrotreating conditions and contains compounds or metals (in particular nickel and/or vanadium) and sulfur as impurities, can be employed in the hydrotreating process of this invention. Generally these feed streams also contain coke precursors (measured as Ramsbottom carbon) and nitrogen compounds as impurities. Suitable hydrocarbon-containing feed streams include crude oil (crude petroleum) and heavy fraction thereof, heavy oil extracts, liquid coal pyrolyzates, liquid products from coal liquification, liquid extracts and liquid pyrolyzates from tar sands, shale oil and heavy shale oil fractions. The process of this invention is particularly suited for treating heavy crudes and heavy petroleum residua, which generally have an initial boiling point (at atmospheric pressure) in excess of about 400° F., preferably in excess of about 600° F. The heavy oil feeds generally contain at least about 5 ppmw (parts by weight per million by weight of hydrocarbon-containing feed) vanadium (preferably 5–1000 ppmw V), at least about 3 ppmw Ni (preferably about 3–500 ppmw Ni), at least about 0.5 weight-% sulfur (preferably about 0.5–5.0 weight-% S), about 0.2–2.0 weight-% nitrogen, and about 1–20 weight-% Ramsbottom carbon residue (determined by ASTM D524). The $API_{60}$ gravity (measured at 60° F. of these feeds is generally about 5–30 (preferably about 8–25).

The substantially liquid hydrocarbon-containing feed stream can be substantially free of water but can, in a preferred embodiment, also contain at least about 0.3 weight-% water, generally about 0.3 to about 20 weight-% $H_2O$, preferably about 0.5 to about 10 weight-% $H_2O$, more preferably about 1.0 to about 5.0 weight-% $H_2O$. Water can be residual water which has not been removed from heavy crude oil, or water can be added as liquid water to the hydrocarbon-containing feed stream prior to its contact with the fixed catalyst bed, or water can be added as steam to the hydrocarbon-containing feed stream prior to its contact with the fixed catalyst bed, or water can be added as steam concurrently with the hydrocarbon-containing feed stream prior to its contact with the fixed catalyst bed. Some oil refineries use steam in this manner to alleviate coke deposition in the fixed catalyst bed and thus retard fouling and deactivation of the fixed catalyst bed. The hydrotreating process of this invention is particularly suited for feed streams that contain water because the alumina-containing particles in layer (a), in accordance with this invention, are particularly resistant to the detrimental effect of water during hydrotreating.

The hydrotreating process of this invention can be carried out in any apparatus whereby an intimate contact of the fixed hydrotreating catalyst bed with said hydrocarbon-containing feed stream and a free hydrogen containing gas is achieved, under such conditions as to produce a hydrocarbon-containing product having reduced levels of metals (in particular Ni and V) and sulfur. Generally, a lower level of nitrogen and Ramsbottom carbon residue and higher API gravity are also attained in this hydrotreating process. The hydrotreating process of this invention can be carried out as a batch process or, preferably, as a continuous down-flow process, more preferably in a tubular reactor containing one or more fixed catalyst beds (as will be described later) or in a plurality or fixed bed reactors in parallel or in series. The hydrocarboncontaining product stream can be distilled, e.g., in a fractional distillation unit, so as to obtain fractions having different boiling ranges.

Any suitable reaction time (contact time) between the fixed catalyst bed, the hydrocarbon-containing feed stream, the hydrogen-containing gas and, optionally, steam can be utilized. In general, the reaction time will be in the range of from about 0.05 hours to about 10 hours, preferably from about 0.4 to 5 hours. In a continuous fixed bed operation, this generally requires a liquid hourly space velocity (LHSV) in the range of from about 0.10 to about 10 cc of feed per cc of catalyst per hour, preferably from about 0.2 to about 2.5 cc/cc/hr.

The hydrotreating process employing the fixed catalyst bed of the present invention can be carried out at any suitable temperature. The reaction temperature will generally be in the range of about 250° C. to about 550° C. and will preferably be in the range of about 300° C. to about 450° C. Higher temperatures do improve the removal of impurities but temperatures which will have adverse effects on the hydrocarbon containing feed stream, such as excessive coking, will usually be avoided. Also, economic considerations will usually be taken into account in selecting the operating temperature.

Any suitable pressure may be utilized in the hydrotreating process. The reaction pressure will generally be in the range from of about atmospheric pressure (0 psig) to up to 5,000 psig. Preferably, the pressure will be in the range of from about 100 to about 2500 psig. Higher pressures tend to reduce coke information, but operating at high pressure may be undesirable for safety and economic reasons.

Any suitable quantity of free hydrogen can be added to the hydrotreating process. The quantity of hydrogen used to contact the hydrocarbon containing feed stream will generally be in the range of from about 100 to about 10,000 standard cubic feet $H_2$ per barrel of hydrocarbon containing feed stream and will more preferably be in the range of from about 1,000 to about 5,000 standard cubic feed $H_2$ per barrel of the hydrocarbon containing feed stream. Either pure hydrogen or a free hydrogen containing gas mixture (e.g., $H_2$ and $CH_4$, or $H_2$ and CO, or $H_2$ and $N_2$) can be used.

If desired, the hydrotreating process of this invention may comprise the step of adding at least one added thermally decomposable metal compound into the hycrocarbon-containing feed stream prior to its being contacted with the catalyst composition of this invention. The metal in the added thermally decomposable metal compound is selected from compounds of metals of Group IIIB, IVB, VIB, VIIB, VIII, IB and IIB of the Periodic Table (as defined above). Preferred metals are molybdenum, tungsten, manganese, chromium, zirconium and zinc. Molybdenum is a particularly preferred metal which may be introduced as a carbonyl, acetate, acetylacetonate, carbonxylate (e.g., octoate), naphthenate, mercaptide, dithiophosphate or dithiocarbamate. Molybdenum hexacarbonyl, molybdenum dithiophosphate and molybdenum dithiocarbamate are particularly preferred additives. The life of the catalyst composition and the efficiency of the demetallization process is improved by introducing at least one of the above-cited decomposable metal compounds into the hydrocarbon containing feed, which also contains metals such as nickel and vanadium. These additives can be added continuously or intermittently and are preferably added at a time when the catalyst composition of this invention has been partially deactivated so as to extend its life. Any suitable concentration of the additive may be added to the hydrocarbon containing feed stream to result in a concentration of the metal (preferably molybdenum) of said decomposable compounds in the range of from about 1 to about 1,000 parts per million by weight and more preferably in the range of about 5 to about 100 parts per million in said feed stream.

At least a portion of the hydrotreated product stream which has been produced in the process of this invention can subsequently be cracked, e.g., in a fluidized catalytic cracking unit, employing zeoliteor clay-containing cracking catalyst, under such conditions as to produce lower boiling hydrocarbon materials, such as gasoline and kerosene, suitable for use as fuels and other useful products. It is within the scope of this invention to hydrotreat the product stream having reduced contents of metals and sulfur in a second hydrotreating process using a different fixed catalyst bed, such as zinc titanate-supported $Ni/MoO_3$ catalysts, for further removal of sulfur and other impurities (e.g., metals) before the product stream is introduced into a cracking reactor and treating under cracking conditions.

(B) Composition of Matter and Preparation Thereof

As has been described in the "Summary of the Invention", the impregnated, substantially spherical alumina-containing particles of this invention are prepared by a process comprising the steps of impregnating and then heating a suitable starting material under suitable conditions, so as to obtain a product having a specific set of properties. Any suitable substantially spherical alumina containing particles which have the following initial parameters can be used as said starting material for step (A): average particle diameter of at least about 0.05 inch, preferably in the range of from about 0.05 to about 1.5 inch, more preferably from about 0.1 to about 1.0 inch; surface area (determined by the BET/$N_2$ method; ASTM D3037) of at least about 20 $m^2/g$, preferably in the range of from about 40 to about 600 $m^2/g$, more preferably in the range of from 100 to about 400 $m^2/g$; a pore volume, as determined by mercury intrusion porosimetry (carried out at room temperature and a mercury pressure varying from 0 psi to about 60,000 psi, using an Autopore 9200 instrument of Micromeritics, Norcross, GA), of at least about 0.1 cc/g, preferably in the range of from about 0.2 to about 1.0 cc/g., more preferably from about 0.3 to about 0.7 cc/g; and content to alumina, which generally is a mixture of gamma-alumina and amorphous alumina, of at least about 80 weight-% $Al_2O_3$, preferably in the range of from about 90 to about 99 weight-% $Al_2O_3$, more preferably from about 93 to about 98 weight-% $Al_2O_3$. The preferred starting material has a normalized crush strength per particle, determined as side plate crush strength by means of a mechanical force gauge, such as the one described in Example I, of at least 100 lb. per inch diameter per particle, more preferably in the range of from about 100 to about 400 lb. per inch diameter per particle; and a Na content of less than about 2.0 weight-%, more preferably below about 1.0 weight-% Na, most preferably below about 0.5 weight-% Na. A presently particularly preferred starting material is a commercially available spherical, alumina-containing Claus catalyst material that is marketed by the Alumina Company of America, Pittsburgh, PA under the product designation of S-100 (see Example II).

Preparation step (A), as described above, can be carried out in any suitable manner. The solvent is the impregnating solution used in step (A) generally comprises water, and preferably consists essentially of water. Suitable solvents which can be used besides water are alcohols such as methanol, ethanol, ethylene glycol and the like, acetone, esters such as ethyl acetate and the like. However, these non-aqueous solvents are presently not preferred. The concentration of ammonium sulfate in the impregnating solution of step (A) can be in the range of from about 0.05 to about 5 mol/l, preferably in the range of from about 0.1 to about 1.0 mol/l (i.e., mols $(NH_4)_2SO_4$ per liter solution).

The impregnation of the alumina-containing starting material with the impregnating solution can be carried out in any suitable manner. Preferably the starting material is soaked with the $(NH_4)_2SO_4$-containing impregnating solution, more preferably with agitation such as mechanical stirring, for a period of time long enough to allow dissolved ammonium sulfate to penetrate into the substantially spherical, alumina-containing particles of the starting material, more preferably to the core of these particles. Any suitable weight ratio of said starting material to the impregnating solution can be employed. Preferably, the weight ratio of said starting material to said impregnating solution will be in the range of from about 0.1:1 to about 2.0:1, more preferably from about 0.3:1 to about 1.2:1. Even though presently not preferred, other impregnating methods can be applied, such as spraying of the $(NH_4)_2SO_4$-containing impregnating solution onto the substantially spherical, alumina-containing particles of the starting material.

Even though the material obtained in step (A) can be directly processed in step (B), it is presently preferred to substantially dry the impregnated material obtained in step (A) in drying step (A1). The drying step (A1) is generally carried out in air or an inert gas, at a temperature ranging from about 25° C. to about 200° C. (preferably 50°–100° C.) so as to remove the greatest portion of water from the mixture obtained in step (B). Vacuum conditions may be employed but are presently not preferred. The at least partially dried mixture generally contains less than about 20 weight-% water. The rate of drying is controlled so as to avoid surges of water vapor that can cause the impregnating solution to splatter and can cause the solute to excessively accumulate in surface regions of the solid particles. Depending on the drying temperature and specific drying conditions (such as extend air movement; thickness of the solid layer to be dried), the drying time ranges generally from about 0.5 hour to about 100 hours, preferably from about 1 hour to about 30 hours.

The impregnated alumina-containing material obtained in step (A), or alternatively step (A1), is heated (calcined) at a temperature in the range of from about 500° to about 900° C., preferably from about 550° to about 800° C., more preferably from about 600° to about 750° C. The heating time is at least 10 minutes, preferably in the range of from about 10 minutes to 20 hours, more preferably from about 0.5 to about 10 hours. The pressure can be atmospheric (preferred) or subatmospheric or superatmospheric. The heating process can be carried out in a free oxygen containing gas atmosphere, such as air, or in an inert or in a reducing gas atmosphere. Presently heating in an $O_2$-containing gas is preferred. It is believed that heating in an $O_2$-containing gas insures that sulfate groups remain in the calcined material obtained in step (B). The gas atmosphere may contain water vapor, but the amount of water vapor should be minimized to less than about 10 volume percent.

Generally the above-described heating (calcining) of the impregnated spherical, alumina-containing material results in a tolerable decrease in surface area, in a slight increase in total pore volume, but in a substantial increase of the pore volume in pores having a pore diameter in the 40–200 Angstroms (A) range. Preferably, the impregnated substantially spherical alumina-containing particles in catalyst layer (a), obtained by the preparation process of this invention, have a pore volume of pores in the 40–200 A pore diameter range in excess of about 50%, more preferably from about 50 to about 90% of the total pore volume. Preferably, the total $BET/N_2$ surface area of the impregnated, substantially spherical particles of this invention is in the range of from about 50 to about 300 m$^2$/g, and the total pore volume (determined by mercury porosimetry, discussed above) is in the range of from about 0.3 to about 0.8 cc/g.

The crush strength of the impregnated, substantially spherical alumina-containing particles of this invention is preferably measured after they have been used in a hydrotreating process in the presence of water, as has been described above and also in Example I, so as to determine the retention of initial crush strength under these severe hydrotreating conditions (about 2250 psi total pressure, about 400 psi partial pressure of steam, 700° F., 100 hours; with at least about 0.5 weight-% sulfur in the hydrocarbon-containing feed). The thus determined crush strength generally exceeds 150 lb. per inch diameter per particle and preferably is in the range of about 150 to about 350 lb./inch/particle.

The impregnated, substantially spherical alumina-containing particles of this invention can be promoted with at least one element or compound at least one element (i.e., one or mixture of two or more) selected from the group consisting of Y, La, Ce, Ti, Zr, Hf, Cr, Ho, W, Mn, Re, Ni, Co, Cu, Zn, P (as phosphite and/or phosphate), preferably Mo, Ni and Co, more preferably Mo. The total promoter level generally is relatively low and suitably ranges from about 0.01 to about 3.0 weight-% of said at least one element, preferably from about 0.1 to about 2.0 weight-%, more preferably from about 0.2 to about 1.0 weight-% of said at least one element (most preferably Mo).

Any suitable technique for promoting the particles of this invention can be employed, preferably the impregnating solution used in step (A) contains one or more of the above-described promoters besides (NH4)2SO4. The thus obtained particles, which additionally contain at least one promoter compound, then undergo step (B), optionally after step (A1), as described above. It is, of course, possible (yet presently not preferred) to carry out step (A) without having any transition metal and/or phosphorous promoter compound present in the impregnating solution, and to impregnate the calcined material obtained in step (B) with a solution containing at least one promoter compound, followed by drying and calcining (preferably at about 500°–900° C.) of the thus twice-impregnated material (so as to at least partially convert the at leasat one transition metal compound to oxides of said metal). Generally the crush strength of the impregnated, substantially spherical alumina-containing particles is not substantially affected by the presence of one or more promoters.

(C) Fixed Catalyst Bed

In accordance with this invention, a fixed catalyst bed, suitable for hydrotreating substantially liquid hydrocarbon-containing feed streams which also contain sulfur and metal compounds (as has been described earlier for one embodiment of this invention), is provided comprising at least one layer (a) of the impregnated, substantially spherical alumina-containing material of this invention.

In a preferred embodiment of this invention the fixed catalyst bed comprises at least one layer (a), as described above, and at least one layer (b) of catalyst particles, different from those in layer (a). The catalyst particles in layer (b) generally comprise an inorganic refractory carrier. Non-limiting examples of such inorganic refractory carrier materials are those that comprise (preferably consist essentially of) alumina (preferred), aluminum phosphate, silica, titania, zirconia, zirconium phosphate, ceria, boria, magnesia, silica-alumina, titania-silica, titania-alumina. In addition to the carriers, the catalyst particles in catalyst bed layer (b) comprise at least one promoter selected from compounds of metals of Groups IIIB, IVB, VB, VIB, VIIB, VIII, IB and IIB of the Periodic Table. Presently preferred promoters are compounds of metals selected from the group consisting of Y, La, Ce, Ti, Zr, Cr, Mo, W, Mn, Re, Ni, Co and Cu, more preferably oxides and/or sulfides of these metals, most preferably Mo, Ni, Co, and mixtures of any of these metal oxides and sulfides. Phosphorus compounds of these metals can also be present. Generally the total level of promoter ranges from about 0.5 to about 30 weight-%, preferably from about 1 to about 15 weight-%, based on the elemental metal. Generally the BET/N2 surface area of the particles in layer (b) is in the range of from about 50 to about 500 m²/g, and their pore volume (measured by mercury porosimetry) is in the range of from about 0.2 to about 2.0 cc/g.

The catalyst particles in layer (b) can be prepared by any suitable technique such as contacting of the carrier (preferably alumina) with one or more solutions containing one or more compounds of the promoter metals (plus, optionally, one or more compounds of phosphorus) and subsequent drying and calcining (this method presently being preferred) as has been described for promoted particles in layer (a); or by coprecipitation e.g., of hydrogels of alumina and promoter metal (e.g., Ni, Co, Mo), followed by drying and calcining. Suitable commercially available catalyst materials for layer (b) are described in Example I.

Layers (a) and (b) can be arranged in the fixed catalyst bed of this invention in any suitable manner. In one preferred embodiment layer (a) is placed as support layer below at least one catalyst layer (b). In another embodiment, layer is placed as a cover layer on top of at least catalyst layer (b). In a further embodiment, layer (a) is placed between at least two catalyst layers (b). In a still further embodiment, in which at least three layers (a) and at least two catalyst layers (b) (which are different from each other) are employed, one layer (a) is placed on top of said at least two catalyst layers (b), one layer (a) is placed as interlayer between two different catalyst layers (b), and a third layer (a) is placed below said at least two lower catalyst layer (b). Another suitable catalyst bed arrangement is shown in FIG. I. The weight ratio of each catalyst layer (a) to each catalyst layer (b) is generally in the range of from about 1:100 to about 1:1, preferably from about 1:20 to about 1:5.

The dimensions of catalyst bed layer (a) comprising the substantially spherical alumina-containing particles obtained by the above-described heating process are not critical and depend on the dimension of the hydrotreating reactor that holds the fixed catalyst bed. Generally the height of each layer (a) ranges from about 1 to about 50 feet in commercial hydrotreating operations. It is within the scope of this invention to have additionally inert particles present (up to 50 weight-%) in layer (a), such as inert ceramic particles, in particular Denstone D-57. The height of each catalyst layer (b) can vary widely, depending on the particular reactor dimensions.

If desired, the fixed catalyst bed of this invention can be sulfided by treatment with a fluid stream that contains sulfur compounds, generally prior to said hydrotreating process. Non-limiting examples of such fluid streams are solutions of mercaptans, mercaptoalcohols, organic sulfides and organic disulfides in a suitable organic solvent (such as gas oil and other petroleum fractions), and gas streams that comprise H2S, such as mixtures of H2 and H2S. This sulfiding procedure is generally carried out at an elevated temperature (preferably at about 400°–700° F.) for a period of time sufficient (preferably from about 0.5-20 hours) so as to convert at least a portion of any compounds of one or more metals contained in particles of layer (b), and optionally also in particles of layer (a), to sulfides of said one or more metals.

In general, the fixed catalyst bed of this invention is utilized primarily for demetalization and desulfurization. The time in which the fixed catalyst bed of this invention will maintain its activity for the above process will depend upon the hydrotreating conditions and the composition of the hydrocarbon-containing feed. Generally, the temperature of the hydrotreating process is gradually increased to compensate for loss of catalyst activity due to fouling (e.g., due to deposition of coke and metals as the catalyst). The entire fixed catalyst bed or one or more layers of the fixed catalyst bed can, if desired, be regenerated when the catalytic activity has dropped below a desired level. Catalyst regeneration can be carried in-situ by discontinuing the flow of hydrogen and of the hydrocarbon-containing feed streams, purging the fixed bed reactor with an inert gas (e.g., N2), and then heating the fixed catalyst bed in a free oxygen-containing gas atmosphere (such as air), under such conditions as to remove carbonaceous materials and to at least partially convert sulfides of transition metals such as Mo, Co and/or Ni back to their oxides and/or phosphates. Preferably, however, the fixed bed layers are removed from the cooled hydrotreating reactor after said purging and are transferred to another reactor where the catalyst regeneration takes place. Generally the catalyst regeneration step is carried out at about 400°–600° C. and at a pressure of about 0–1,000 psig.

The following examples are presented in further illustration of the invention and are not to be considered as unduly limiting the scope of this invention.

EXAMPLE I

This example illustrates the evaluation of catalyst bed support particles in oil hydrotreating tests, in the presence of steam. The purpose of this evaluation procedure is to determine the hydrodemetallization activity and the retention to crush strength of these support particles under severe hydrotreating conditions, in the presence of steam.

The catalyst bed arrangement (simulating proportions of a typical refinery bed loading) which was used in the evaluation tests is shown in FIG. 1. The catalyst bed column had a diameter of about 0.75 inches. Particles A were substantially spherical alumina-containing particles, which can be any of the particles A1 through A11 described in more detail in Example II. Material B was a commercial alumina-supported hydrotreating catalyst comprising 0.9 weight-% Co, 0.5 weight-% Ni and 7.5 weight-% Mo, having a BET/$N_2$ surface area of 174 $m^2/g$ and a pore volume of 0.63 cc/g (measured by mercury intrusion porosimetry). Material C was a commercial alumina-based hydrotreating catalyst comprising 3.1 weight-% Ni, 7.9 weight-% Mo and 4.6 weight-% Ti having a BET/N surface area of 140 $m^2/g$ and a pore volume (by Hg intrusion porosimetry) of 0.5 cc/g. Material D was a commercial alumina-based hydrotreating catalyst comprising 2.4 weight-% Co and 6.7 weight-% Mo, having a BET/$N_2$ surface area of 290 $m^2/g$ and pore volume (by Hg intrusion porosimetry) of 0.47 cc/g.

A heavy oil-water mixture containing about 4–8 volume-% $H_2O$ was pumped to a metallic mixing T-pipe where it was mixed with a controlled amount of hydrogen gas. The heavy oil was a Maya 400F+ resid having an $API^{60}$ gravity of 14.0, containing 3.8 weight-% sulfur and about 350 ppmw (Ni+V) (parts by weight of Ni+V per million parts by weight of oil feed). The oil/water/hydrogen mixture was pumped downward through a stainless steel trickle bed reactor which contained the multi-layer catalyst bed described above (see FIG. I). The tubular reactor was about 28.5 inches long, had an inner diameter of about 0.75 inches, and was fitted inside with a 0.25 inch O.D. axial thermocouple well. The reactor was heated by a 3-zone furnace. The reactor temperature was usually measured in four locations along the reactor bed by a traveling thermocouple that was moved within the axial thermocouple well.

Generally, the hydrotreating conditions were as follows: reaction temperature of about 690°–720° F.; liquid hourly space velocity (LHSV) of about 0.3 cc/cc catalyst/hour; about 2,250 psig total pressure; about 400 psig $H_2O$ (steam) partial pressure; time on stream: about 100–200 hours. When it was desired to determine the desulfurization and demetallization activity of the catalyst bed, the liquid product was filtered through a glass filter and analyzed for sulfur, nickel and vanadium by plasma emission analysis.

After completion of the hydrotreating test, the reactor with catalyst bed was flushed with xylene so as to remove undrained oil. Thereafter, nitrogen gas was passed through the xylene-washed catalyst bed so as to dry it. The various catalyst layers were carefully removed. Particles A, B or C were tested for crush strength in a Mechanic Force Gauge D-75M of Hunter Spring, Division of Ametek, Hot Field, PA. A single sphere of A or B or C, the average diameter of which had been measured, was placed between the metal plates of D-75M, and the plates were slowly moved toward one another by means of an electric motor. The force applied to the plates was displayed by a gauge. The force necessary to fracture (crush) a catalyst sphere was recorded as the crush strength of the sphere. The normalized crush strength, defined as crush strength of a sphere divided by its average particle diameter (1b/sphere/inch diameter), was calculated.

EXAMPLE II

This example illustrates the preparation of the substantially spherical alumina-containing particles of this invention and of other alumina-containing catalyst bed particles.

Control Particles A1 were spherical, Co/Mo-promoted alumina particles, marketed by Shell Chemical Company, Houston, TX under the product designation "Shell 544", suitable as support balls for hydrotreating catalyst beds. Pertinent properties of Particles A1 were: diameter of 1/6 inch; cobalt content of 1.7 weight-%; molybdenum content of 5.3 weight-%; surface area of 300+ $m^2/g$; total pore volume of 0.47 cc/g; loss on ignition (LOI; weight loss when heated to 482° C.) of 0.8 weight-%; compacted bulk density (compacted loading density) of about 0.83 g/cc; and side plate crush strength of 30+ lb/particle (i.e., about 190 lb/particle/inch diameter).

Control Particles A2 were substantially spherical, substantially unpromoted alumina-containing particles having an average particle diameter of ¼ inch; a BET/$N_2$ surface area of about 325 $m^2/g$; a total pore volume of about 0.50 $m^2/g$; and average normalized individual ball crush strength of about 240 lb/particle/inch diameter (i.e., the actual crush strength of a ¼" sphere was about 60 lb/particle); $Al_2O_3$ content of about 94.6 weight-%; $Na_2O$ content of about 0.35 weight-%; and LOI content (weight loss when heated from 250° C. to 1200° C., a measure of hydroxyl content) of 5.0 weight-%. Particles A2 were supplied by Aluminum Company of America, Pittsburgh, PA under the product designation of S-100.

Control Particles A3 were obtained when Control Particles A2 were heated at about 650° C. for about one hour.

Control Particles A4 were obtained by soaking 100 grams of Control Particles A2 with an aqueous solution containing about 1.1 grams of ammonium heptamolybdate, $(NH_4)_6Mo_7O_{24}\cdot H_2O$ (provided by Alfa Products, Danvers, MA), dissolved in 100 cc of deionized water for about 20 minutes, as to provide a promoter level of about 0.3 weight-% Mo in the particles (after calcining); decanting excess solution; drying the thus impregnated particles at about 150° C. for about 2 hours, and then calcining them at about 650° C. for about 2 hours in air.

Control Particles A5 also contained about 0.3 weight-% Mo, and were obtained when 60 grams of Control Particles A2 were soaked in 100 cc of an aqueous solution containing about 1.1 grams of ammonium heptamolybdate and about 3.0 grams of ammonium bisulfate, NH$_4$HSO$_4$, decanting excess solution, drying at about 150° C. for about 2 hours and calcining at about 650° C. for about 2 hours in air.

Invention Particles A6 also contained about 0.3 weight-% Mo, and were prepared essentially in accordance with the preparation of particles A5, except that 3.0 grams (NH$_4$)$_2$SO$_4$ was used in lieu of 3.0 grams NH$_4$HSO$_4$.

Invention Particles A7, A8, A9, A10 and A11, respectively, were prepared essentially in accordance with the preparation procedure for Invention Particles A6, except that the (NH$_4$)$_2$SO$_4$ concentrations in the impregnating solutions were 0.5, 1.0, 2.0, 5.0 and 10.0 weight-% (NH$_4$)$_2$SO$_4$.

EXAMPLE III

This example illustrates the beneficial effect of the impregnation of spherical alumina particles with (NH$_4$)$_2$SO$_4$ on the crush strength retention of the calcined particles (containing about 0.3 weight-% Mo).

In one test series, the average crush strength of Invention Particles A6 was compared with the average crush strength of Control Particles A4 and A5, measured in accordance with the procedure described in Example I. Results:

Invention Particles A6 (impregnated with (NH$_4$)$_2$SO$_4$) had a crush strength of 9.0 lb per particle; Control Particles A5 (impregnated with NH$_4$HSO$_4$ had a crush strength of 8.3 lb per particle; and Control Particles A4: (not impregnated with a sulfate) had a crush strength of 8.2 lb per particle.

Figure 2:
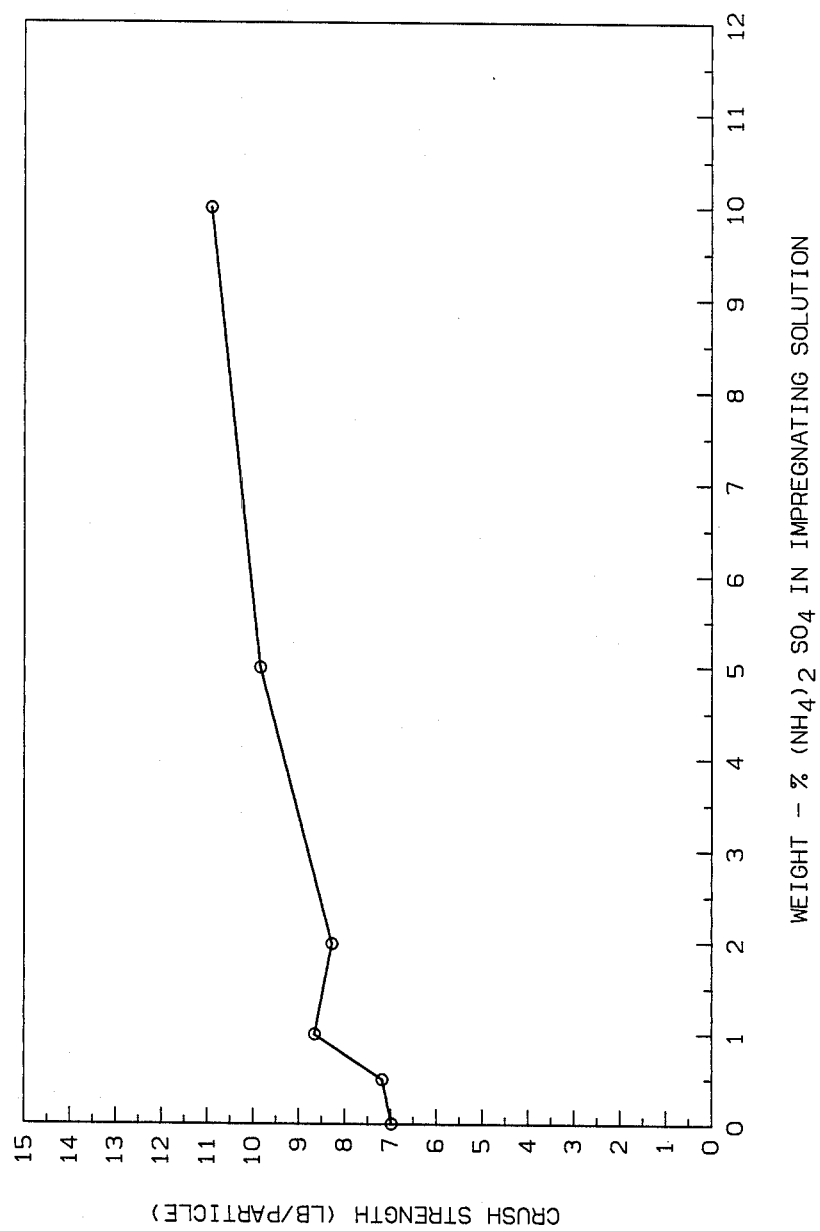
FIG. 2 is a graph showing the dependence of crush strength (determined after use in hydrotreating test) of impregnated alumina-containing particles on the $(NH_4)_2SO_4$ concentration in the impregnating solution.

In another test series, the effect of the (NH$_4$)$_2$SO$_4$ concentration of the impregnation solution on the crush strength, determined in accordance with the procedure of Example I, of calcined Particles A7 through A11 was investigated. Test results are shown in FIG. 2.

The above-described tests results clearly show that, surprisingly, the impregnated of spherical alumina-containing particles with (NH$_4$)$_2$SO$_4$ was beneficial for the crush strength retention of calcined particles in hydrotreating test runs employing steam. This result was quite surprising since no such advantage of the impregnating of alumina-containing particles with NH$_4$HSO$_4$ was observed. Also, the crush strength of "fresh" spherical alumina-containing particles (i.e., particles that had not been used in test runs employing steam) was about the same for unimpregnated particles and for (NH$_4$)$_2$SO$_4$-impregnated particles. Since analytical test results indicated that the calcined, (NH$_4$)$_2$SO$_4$ impregnated invention particles contained some sulfate it is believed that the incorporation of sulfate ions into the alumina structure of the spherical particles was responsible for the enhanced hydrothermal crush strength retention.

EXAMPLE IV

This example illustrates the effect of the heating (calcination) conditions on pertinent physical properties of alumina-containing spheres. A2 particles of about ⅛ inch diameter that had been impregnated with about 0.3 weight-% Mo were heated in air at temperatures ranging from 400° C. to 900° C. for about 1 hour, (so as to prepare Particles A4). The crush strength of the thus calcined particles (diameter: ⅛ inch) was determined in accordance with the procedure described in Example I. Tests results are summarized in Table I and are plotted in FIG. 3.

TABLE I

| Calcination Temp. (°C.) | Crush Strength (lb/Particle) | Normalized Crush Strength (lb/Inch Diameter) |
|---|---|---|
| 400 | 1.88 | 15.0 |
| 500 | 3.42 | 27.4 |
| 600 | 4.37 | 35.0 |
| 700 | 4.80 | 38.4 |
| 800 | 3.95 | 31.6 |
| 900 | 1.65 | 13.2 |

Figure 3:
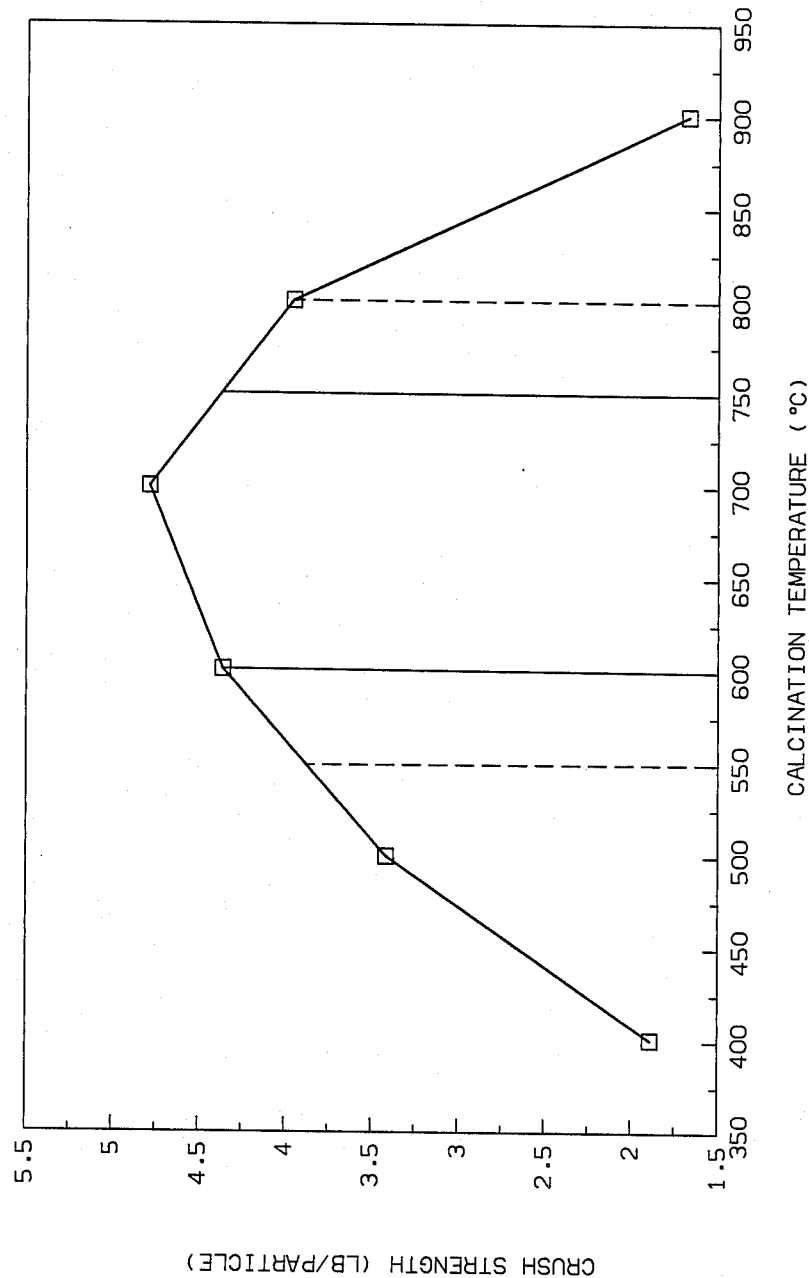
FIG. 3 is a graph showing the dependence of crush strength (determined after use in hydrotreating test) of alumina-containing particles on the calcination temperature.

Data in Table I and FIG. 3 clearly show that maximum crush strength (after hydrotreating in the presence of steam) was attained when the alumina spheres (containing 0.3 weight-% Mo) were calcined at a temperature in the range of from about 550° to about 800° C., preferably from about 600° to about 750° C.

The effect of the calcination time, at a calcination temperature of 650° C., is shown in Table II.

TABLE II

| Calcination Time (minutes) | Crush Strength (lb/Particle) | Crush Strength (lb/Inch Diameter) |
|---|---|---|
| 20 | 7.01 | 56.1 |
| 40 | 7.25 | 58.0 |
| 60 | 7.20 | 57.6 |
| 90 | 6.68 | 53.4 |
| 120 | 6.41 | 51.3 |
| 240 | 5.22 | 41.8 |

Data in Table II show that a calcination time of about 20-90 minutes was suitable for ⅛ inch diameter alumina-containing Particles A4a. Prolonged calcining had a detrimental effect.

Based on the above-described test results, it is concluded that the preferred heating conditions in step (A) for preparing the impregnated, substantialy spherical alumina-containing particles of this invention (such as Particles A6 through A11) will also comprise a temperature of about 550°-800° C. (more preferably about 600°-750° C.) and a heating time of about 20-90 minutes.

EXAMPLE V

Figure 4:
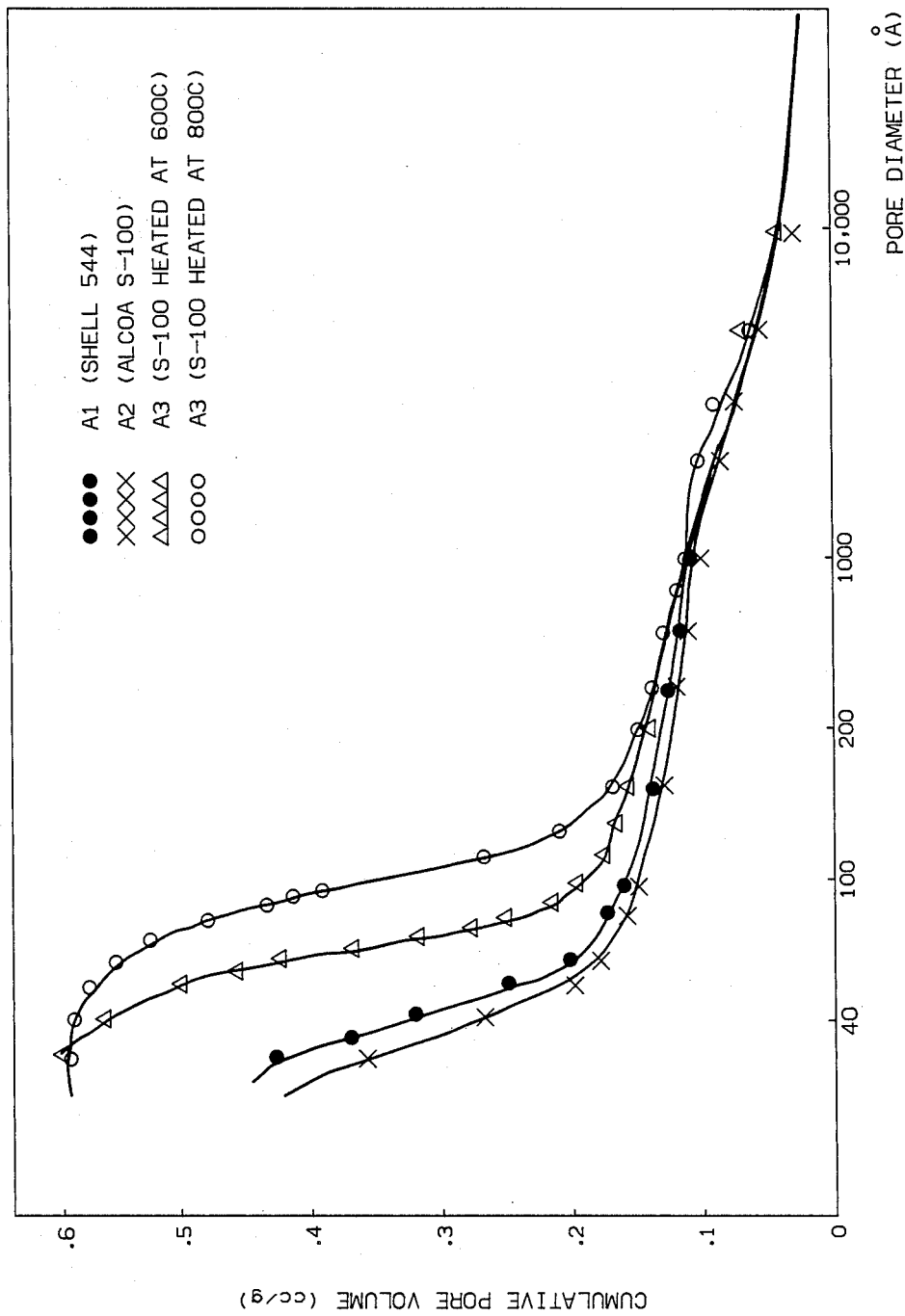
FIG. 4 exhibits pore distribution curves for several alumina-containing particles.

The effect of the calcination temperature of the pore volume distribution of Particles A1, A2 and A3 was investigated. Pore volume and pore diameter of these particles were determined by measuring intrusion porosimetry (carried out at room temperature at a mercury ranging from 0 psi to 60,000 psi, using an Autopore 9200 instrument of Micromeritics, Norcross, GA). In FIG. 4, pore volume was plotted versus logarithm of pore diameter for A1, A2 and two A3 samples. FIG. 4 shows that A1 (Shell 544, as received; 1/6" diameter) and of A2 (Alcoa S-100, as received; 1/16" diameter) had very similiar pore distributions, whereas the pore distributions of the two A3 samples (obtained by heating 1/16" A2 particles at 600° C. and 800° C., respectively, for about 3 hours), differed significantly from those of A1 and A2. The most significant changes that resulted when A2 (S-100) particles were heated at 600° C. and 800° C., respectively, (so as to make A3 particles), was a shift toward a substantially greater portion of pores in the 40-200A pore diameter range. About 80% of the total pore volume of A3 was in pores of the 40-200 Angstrom range, whereas the percentage of the total pore volume of A1 and A2 in the 40-200 Angstrom pore diameter range was only about 40%.

Based on the above-described test results, it is concluded that heating at 600°-800° C. in step (A) for preparing the impregnated, substantially spherical alumina-containing particles of this invention will have a very similar effect in the pore volume distribution of the particles of this invention (such as Particles A6 through A11) as the above-described effect on the pore volume distribution of Particles A3.

The total pore volume of the Mo-impregnated alumina spheres A3 ranged from about 0.5 to about 0.6 cc/g when the calcination was carried out for 16 hours at a temperature in the range of from about 400° C. to about 800° C. Thus, the effect of the calcination temperature on the total pore volume of calcined spheres A3 was rather insignificant. Based on these results, it is concluded that the total pore volume of the impregnated, substantially spherical alumina-containing particles of this invention (such as Particles A6 through A11) will also vary only insignificantly with the calcination temperature.

EXAMPLE VI

This example illustrates the improved performance of Particles A4 (with 0.3 weight-% Mo) in prolonged hydrotreating tests versus Particles A1 and A2. Crush strength results, obtained substantially in accordance with the hydrotreating procedure described in Example I, are summarized in Table III. Hydrotreating conditions were: 2200 psig total pressure; 760° F.; 110 psi steam pressure, LHSV of 0.1 cc/cc catalyst/hour. The resid feed contained about 2.0 weight-% sulfur and about 60 ppmw (Ni+V).

TABLE III

| Particles[1] | Hours on Stream: | | | | | |
|---|---|---|---|---|---|---|
| | 0 | 16 | 30 | 140 | 270 | 360 |
| | Crush Strength (lb/Particle) | | | | | |
| 1/6" A1 | 35 | 11 | N/A | N/A | N/A | N/A |
| ¼" A2 | 58 | 11 | N/A | N/A | N/A | N/A |
| ¼" A4 | 55 | 39 | 37 | 34 | 38 | 38 |
| ⅛" A4 | 100+ | 80+ | 80+ | 80+ | 80+ | 80+ |
| ⅛" B | 49 | N/A | 42 | N/A | N/A | N/A |

[1]Fractions indicate particle diameter expressed in inches.

Test data in Table III clearly show a significant improvement in crush strength retention of Particles A4 over commercial Particles A1 and A2, after use in the severe hydrotreating runs in the presence of steam, as described in Example I. Based on these results and based on the fact that the impregnated, substantially spherical alumina-containing Particles A6 through A11 of this invention have a higher crush strength retention that Particles A4 (See Example III and specifically FIG. 2), it is concluded that the impregnated, substantially spherical alumina-containing particles of this invention will also be superior to Particles A1 and A2, in terms of crush strength retention.

Reasonable variations and modifications are possible within the scope of the disclosure and appended claims. That which is claimed is:

1. A process for preparing impregnated, substantially spherical alumina-containing particles, suitable for use in a fixed hydrotreating catalyst bed, said process comprising the steps of
 (A) impregnating (i) a starting material of substantially spherical alumina-containing particles having an initial average particle size of at least about 0.05 inch; an initial surface area, as determined by the BET method employing $N_2$, at least about 20 $m^2/g$; an initial pore volume, as determined by mercury intrusion porosimetry, of at least about 0.1 cc/g; and an initial content of $Al_2O_3$ of at least about 80 weight-%; with (ii) a solution comprising dissolved ammonium sulfonate; and
 (B) heating the material obtained in step (A) at a temperature in the range of from about 500° to about 900° C. for a period of time of at least 10 minutes, under such heating conditions as to obtain a material having a higher retention of crush strength than said starting material; wherein said crush strength is measured after exposure for about 100 hours to a liquid hydrocarbon-containing stream which contains at least about 0.5 weigt-% sulfur, under hydrotreating conditions at about 2250 psig total pressure, about 400 psig partial pressure of steam and a temperature of about 700° F.

2. A process in accordance with claim 1, wherein said starting material used in step (A) has an initial average particle diameter in the range of from about 0.1 to about 1.0 inch, an initial surface area in the range of from about 40 to about 600 $m^2/g$, an initial pore volume in the range of from about 0.2 to about 1.0 cc/g, and an initial normalized crush strength in the range of from about 100 to about 400 lb. per inch diameter per particle.

3. A process in accordance with claim 2, wherein the initial content of Na of said starting material is below about 1.0 weight-%, and said initial content of $Al_2O_3$ is in the range of from about 90 to about 99 weight-%.

4. A process in accordance with claim 1, wherein said concentration of dissolved ammonium sulfate in the solution used in step (A) is in the range of from about 0.05 to about 5.0 mol/l, and the weight ratio of said starting material to said solution is in the range of from about 0.1:1 to about 2.0:1.

5. A process in accordance with claim 4, wherein said concentration of dissolved ammonium sulfate is in the range of from about 0.1 to about 1.0 mol/l.

6. A process in accordance with claim 1, wherein said solution used in step (A) additionally comprises at lest one compound of at least one element selected from the group consisting of Y, La, Ce, Ti, Zr, Hf, Cr, Mo, W, Mn, Re, Ni, Co, Cu, Zn and P.

7. A process in accordance with claim 6, wherein said at least one element is selected from the group consisting of Mo, Ni and Co.

8. A process in accordance with claim 1, wherein said heating in step (B) is carried out at a temperature in the range of from about 550° to about 800° C. for a period of time in the range of from about 10 minutes to about 20 hours.

9. A process in accordance with claim 1, wherein said material obtained in step (B) has a pore volume of pores having a diameter of about 40-200 Angstroms in the range of from 50% to about 90% of the total pore volume, and a normalized crush strength in the range of from about 150 to about 350 lb. per inch diameter per particle.

10. A process in accordance with claim 1, wherein the material obtained in step (B) has a surface area in the range of from about 50 to about 300 $m^2/g$ and a pore volume in the range of from about 0.3 to about 0.8 cc/g.

11. A process in accordance with claim 1 comprising the additional step of
 (C) impregnating the material obtained in step (B) with at least one element or compound of at least one element selected from the group consisting of Y, La, Ce, Ti, Zr, Hf, Cr, Mo, W, Mn, Re, Ni, Co, Cu, Zn and P.

12. A process in accordance with claim 11, wherein said at least one element is selected from the group consisting of Mo, Ni and Co.

13. A process in accordance with claim 11 comprising the additional step of
    (D) drying and calcining the material obtained in step (C).

14. A composition of matter, which is suitable for use in a fixed hydrotreating catalyst bed, comprising impregnated, substantially spherical alumina-containing particles having been prepared by a process comprising the steps of
    (A) impregnating (i) a starting material of substantially spherical alumina-containing particles having an initial average particle size of at least about 0.05 inch; an initial surface area, as determined by the BET method employing $N_2$, of at least about 20 $m^2/g$; an initial pore volume, as determined by mercury intrusion porosimetry, of at least about 0.1 cc/g; and an initial content of $Al_2O_3$ of at least about 80 weight-%; with (ii) a solution comprising dissolved ammonium sulfate; and
    (B) heating the material obtained in step (A) at a temperature in the range of from about 500° to about 900° C. for a period of time of at least 10 minutes, under such heating conditions as to obtain a material having a higher retention of crush strength than said material; wherein said crush strength is measured after exposure for about 100 hours to a liquid hydrocarbon-containing stream which contains at least about 0.5 weight-% sulfur, under hydrotreating conditions at about 2250 psig total pressure, about 400 psig partial pressure of steam and a temperature of about 700° F.

15. A composition of matter in accordance with claim 14, wherein said starting material used in step (A) has an initial average particle diameter in the range of from about 0.1 to about 1.0 inch, an initial surface area in the range of from about 40 to about 600 $m^2/g$, an initial pore volume in the range of from about 0.2 to about 1.0 cc/g, and an initial normalized crush strength in the range of from about 100 to about 400 lb. per inch diameter per particle.

16. A composition of matter in accordance with claim 15, wherein the initial content of Na in said starting material is about 1.0 weight-%, and said initial content of $Al_2O_3$ is in the range of from about 90 to about 99 weight-%.

17. A composition of matter in accordance with claim 14, wherein the concentration of dissolved ammonium sulfate in the solution used in step (A) is in the range of from about 0.05 to about 5 mol/l, and the weight ratio of said solution to said starting material is in the range of from about 0.1:1 to about 2.0:1.

18. A composition of matter in accordance with claim 17, wherein said concentration of dissolved ammonium sulfate is in the range of from about 1.0 to about 1.0 mol/l.

19. A composition of matter in accordance with claim 14, wherein said heating in step (B) is carried out at a temperature in the range of from about 550° to about 800° C. for a period of time in the range of from about 10 minutes to about 20 hours.

20. A composition of matter in accordance with claim 14, having a pore volume of pores having a diameter of about 40–200 Angstroms in the range of from 50% to about 90% of the total pore volume, and a normalized crush strength in the range of from about 150 to about 350 lb. per inch diameter per particle.

21. A composition of matter in accordance with claim 14, having a surface area in the range of from about 50 to about 300 $m^2/g$ and a pore volume in the range of from about 0.3 to about 0.8 cc/g.

22. A composition of matter in accordance with claim 14, having been promoted with at least one element or compound of at least one element selected from the group consisting of Y, La, Ce, Ti, Zr, Hf, Cr, Mo, W, Mn, Re, Ni, Co, Cu, Zn and P.

23. A composition of matter in accordance with claim 22, wherein said at least one element is selected from the group consisting of Mo, Ni and Co.

24. A composition of matter in accordance with claim 22, wherein said at least one element is present at a level in the range of from about 0.01 to about 3.0 weight-%.

25. A composition of matter in accordance with claim 22, wherein said at least one element is present at a level in the range of from about 0.1 to about 2.0 weight-%.

26. A composition of matter in accordance with claim 14, further comprising catalyst particles comprising a refractory inorganic carrier and at least one hydrogenation promoter selected from the group consisting of transition metals belonging to Groups IIIB, IVB, VB, VIB, VIIB, VIII, IB and IIB of the Periodic Table and compounds of said transition metals; wherein said catalyst particles are different from said impregnated, substantially spherical alumina-containing particles.

27. A composition of matter in accordance with claim 26, wherein said refractory inorganic carrier comprises alumina, and said at least one hydrogenation promoter is selected from the group consisting of compounds of Y, La, Ce, Ti, Zr, Cr, Mo, W, Mn, Re, Ni, Co and Cu.

28. A composition of matter in accordance with claim 26, wherin said catalyst particles comprise alumina as carrier material and at least one hydrogenation promoter selected from the group consisting of oxides and sulfides of Mo, oxides and sulfides of Ni, oxides and sulfides of Co, and mixtures thereof, and have a surface area in the range of from about 50 to about 500 $m^2/g$ and a pore volume in the range of from about 0.2 to about 2.0 cc/g.

29. A composition of matter in accordance with claim 25, wherein said impregnated, substantially spherical alumina-containing particles are contained in at least one layer (a), and said catalyst particles are contained in at least one layer (b).

30. A composition of matter in accordance with claim 29, wherein at least one layer (a) is located below at least one layer (b).

31. A composition of matter in accordance with claim 29, wherein at least one layer (a) is located on top of at least one layer (b).

32. A composition of matter in accordance with claim 29, comprising at least three layers (a) and at least two layers (b); wherein one layer (a) is placed on top of at least two layers (b), one layer (a) is placed below at least two layers (b), and one layer (a) is placed between two layers (b).

33. A composition of matter in accordance with claim 29, wherein the weight ratio of each layer (a) to each layer (b) is in the range of from about 1:100 to about 1:1.

* * * * *

UNITED STATES PATENT AND TRADEMARK OFFICE
CERTIFICATE OF CORRECTION

PATENT NO. : 4,820,676
DATED : April 11, 1989
INVENTOR(S) : Simon G. Kukes and Karlheinz K. Brandes It is certified that error appears in the above-identified patent and that said Letters Patent is hereby corrected as shown below:

Claim 1, column 15, line 65, insert --- of --- after "$N_2$".

Claim 1, column 16, line 2, delete "sulfonate" and substitute --- sulfate --- therefor.

Claim 6, column 16, line 38, delete "lest" and substitute --- least --- therefor.

Claim 9, column 16, line 50, delete "said" and substitute --- the --- therefor.

Claim 18, column 17, line 57, delete "1.0" before "to" and substitute --- 0.1 --- therefor.

Claim 28, column 18, line 37, delete "wherin" and substitute --- wherein --- therefor.

Signed and Sealed this

Fifth Day of December, 1989

*Attest:*

JEFFREY M. SAMUELS

*Attesting Officer*  *Acting Commissioner of Patents and Trademarks*